US012287080B2

(12) United States Patent
Jogdand et al.

(10) Patent No.: US 12,287,080 B2

(45) Date of Patent: Apr. 29, 2025

(54) LIGHT FIXTURE TRIM ATTACHMENT SYSTEM

(71) Applicant: SIGNIFY HOLDING B.V., Eindhoven (NL)

(72) Inventors: Pradip Vilasrao Jogdand, Pune (IN); Timothy Glenn Wright, Peachtree City, GA (US); Jared Michael Davis, Newnan, GA (US); Jason Quentin Paulsel, Peachtree City, GA (US); Jay Paul Bokros, Senoia, GA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/484,523

(22) Filed: Oct. 11, 2023

(65) Prior Publication Data

US 2024/0125458 A1 Apr. 18, 2024

Related U.S. Application Data

(60) Provisional application No. 63/416,160, filed on Oct. 14, 2022.

(30) Foreign Application Priority Data

Oct. 24, 2022 (EP) .................................... 22203169

(51) Int. Cl.
*F21V 17/16* (2006.01)

(52) U.S. Cl.
CPC .................................. *F21V 17/166* (2013.01)

(58) Field of Classification Search
CPC ........ F21V 17/166; F21V 21/04; F21V 15/01; F21V 17/162; F21S 8/026; F21S 8/02; F21S 8/04
See application file for complete search history.

(56) References Cited

U.S. PATENT DOCUMENTS 3,370,164 A * 2/1968 Green ..................... F21V 17/10 362/322
6,588,922 B1 * 7/2003 DeCicco ................. F21V 21/04 362/148

(Continued)

FOREIGN PATENT DOCUMENTS

CN 104154470 A * 11/2014
TW 202035916 A * 10/2020 ............. F21S 8/026
WO 2023099285 A1 6/2023

OTHER PUBLICATIONS

Search English translation of CN-104154470-A (Year: 2014).*

(Continued)

*Primary Examiner* — Omar Rojas Cadima

(57) ABSTRACT

A trim attachment system includes a light fixture housing and a first coiled spring bracket having a first coil section and a first elongated section. The first elongated section is positioned in the light fixture housing and attached to the light fixture housing, where the first coil section is attachable to a trim to pull up the trim toward an opening of the housing. The trim attachment system further includes a second coiled spring bracket having a second coil section and a second elongated section. The second elongated section is positioned in the light fixture housing and attached to the light fixture housing, where the second coil section is attachable to the trim to pull up the trim toward the opening of the housing.

5 Claims, 13 Drawing Sheets

(56) References Cited

U.S. PATENT DOCUMENTS

| | | | |
|---|---|---|---|
| 7,670,021 | B2 | 3/2010 | Chou |
| 8,182,119 | B2 | 5/2012 | Trott et al. |
| 9,618,195 | B2 | 4/2017 | O |
| 10,731,829 | B2 | 8/2020 | Wronski et al. |
| 2013/0258685 | A1 | 10/2013 | Clifton et al. |
| 2013/0322093 | A1 | 12/2013 | Ono et al. |

OTHER PUBLICATIONS

Search English translation of TW-202035916-A (Year: 2019).*
European Search Report Dated Apr. 18, 2023 For Corresponding EP Application No. 22203169.2, Filed on Oct. 24, 2022 (1 Page).

* cited by examiner

LIGHT FIXTURE TRIM ATTACHMENT SYSTEM

CROSS REFERENCE TO RELATED APPLICATIONS

The present application claims priority to U.S. Provisional Patent Application No. 63/416,160, filed on Oct. 14, 2022 and European Patent Application No. 22203169.2, filed on Oct. 24, 2022. The entire contents of the foregoing applications are hereby incorporated herein by reference.

TECHNICAL FIELD

The present disclosure relates generally to lighting solutions, and in particular to a trim attachment system for light fixtures.

BACKGROUND

Recessed light fixtures typically include a trim. A trim is often attached to another component of a recessed light fixture. For example, a trim may be directly or indirectly attached a light module of a light fixture by an attachment component. In some cases, accessing attachment components to attach or detach a trim from a light fixture component can be challenging. For example, in some cases, attaching or detaching a trim from another component of the light fixture may require the removal of a light module or a light fixture housing of a light fixture. Thus, a solution that simplifies the attachment and detachment of trims to/from light fixtures may be desirable.

SUMMARY

In general, the present disclosure relates generally to lighting solutions, and in particular to a trim attachment system for light fixtures. In an example embodiment, a trim attachment system includes a light fixture housing and a first coiled spring bracket having a first coil section and a first elongated section. The first elongated section is positioned in the light fixture housing and attached to the light fixture housing, where the first coil section is attachable to a trim to pull up the trim toward an opening of the housing. The trim attachment system further includes a second coiled spring bracket having a second coil section and a second elongated section. The second elongated section is positioned in the light fixture housing and attached to the light fixture housing, where the second coil section is attachable to the trim to pull up the trim toward the opening of the housing.

In another example embodiment, a lighting device includes a trim and a trim attachment system. The trim attachment system includes a light fixture housing and a first coiled spring bracket having a first coil section and a first elongated section. The first elongated section is positioned in the light fixture housing and attached to the light fixture housing. The first coil section is attached to the trim such that the first coiled spring bracket pulls up the trim toward an opening of the light fixture housing. The trim attachment system further includes a second coiled spring bracket having a second coil section and a second elongated section. The second elongated section is positioned in the light fixture housing and attached to the light fixture housing, where the second coil section is attached to the trim such that the second coiled spring bracket pulls up the trim toward the opening of the light fixture housing.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein.

Figure 1A:
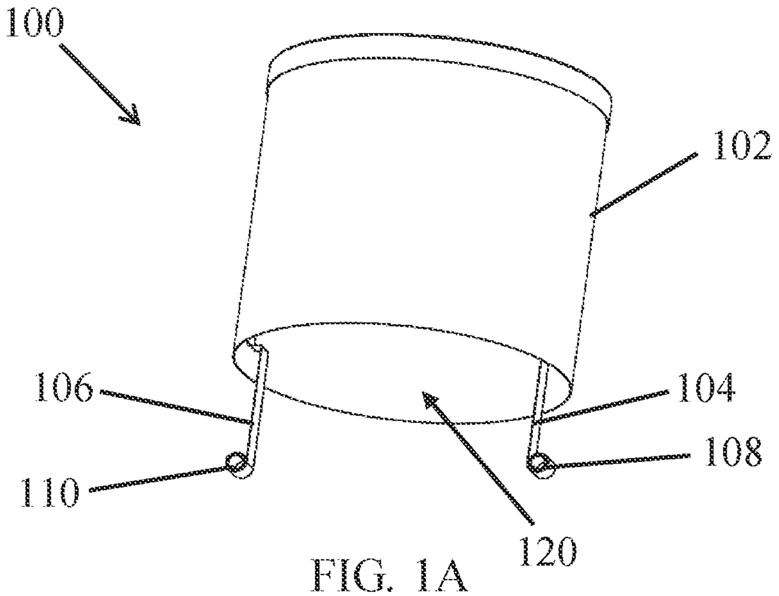
FIG. 1A illustrates a trim attachment system of a light fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, the same reference numerals used in different figures may designate like or corresponding but not necessarily identical elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 1B:
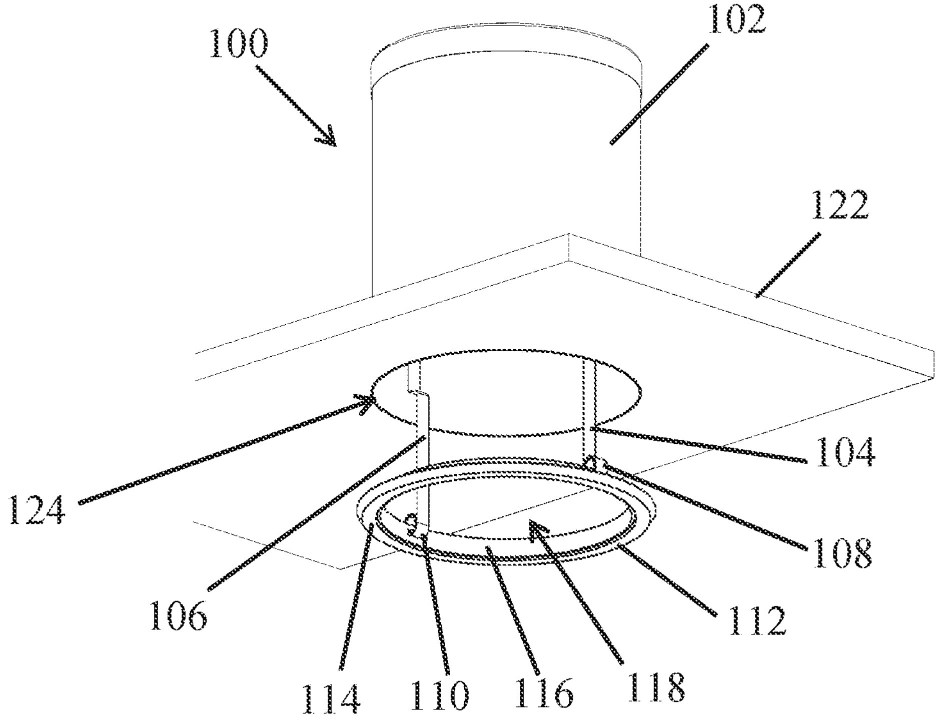
FIG. 1B illustrates a trim attached to the trim attachment system of FIG. 1A according to an example embodiment.

Referring to the figures, FIG. 1A illustrates a trim attachment system 100 of a light fixture according to an example embodiment, and FIG. 1B illustrates a trim 112 attached to the trim attachment system 100 of FIG. 1A according to an example embodiment. In some example embodiments, the trim attachment system 100 includes a light fixture housing 102 and coiled spring brackets 104, 106 that are attached to the light fixture housing 102. The coiled spring brackets 104, 106 may be attached to the light fixture housing 102 on the inside of the light fixture housing 102. The coiled spring brackets 104, 106 may extend through an opening 120 of the light fixture housing 102. The coiled spring brackets 104, 106 may be made from coil steel or another suitable material using methods such as rolling, bending, cutting, etc. as can be readily understood by those of ordinary skill in the art with the benefit of this disclosure. The light fixture housing 102 may be made from aluminum or another suitable material using methods such as cutting, bending, rolling, etc. as can be readily understood by those of ordinary skill in the art with the benefit of this disclosure.

In some example embodiments, the coiled spring bracket 104 may include a coil section 108, and the coiled spring bracket 106 may include a coil section 110, and the coil sections 108, 110 may be attached to the trim 112. For example, the trim 112 may include a flange section 114 and a collar section 116 that extends up from the flange section 114, and the coil sections 108, 110 may be attached to the collar section 116.

In some example embodiments, the light fixture housing 102 can be positioned recessed in a ceiling 122 such that the opening 120 of the light fixture housing 102 is positioned at an opening 124 of the ceiling 122. For example, the coiled spring brackets 104, 106 extending through the opening 120 of the light fixture housing 102 may also extend through the opening 124 of the ceiling 122. The coil sections 108, 110 may be attached to the trim 112 such that an opening 118 of the trim 112 is aligned with the opening 120 of the light fixture housing 102. For example, when the trim 112 is pulled up against the ceiling 122 by the coiled spring brackets 104, 106 as explained below, the collar section 116 of the trim 112 may be at least partially inside the light fixture housing 102.

Figure 2A:
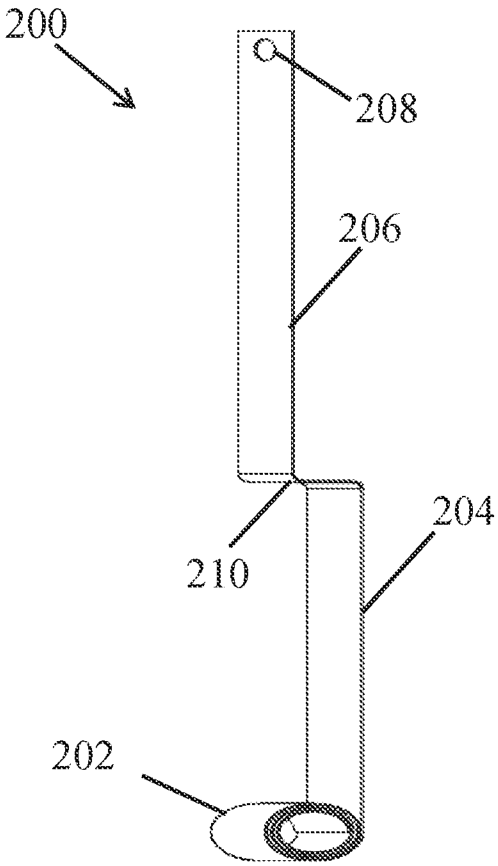
FIGS. 2A-2C illustrate a coiled spring bracket for use in the trim attachment system of FIG. 1A according to an example embodiment.
Figure 2B:
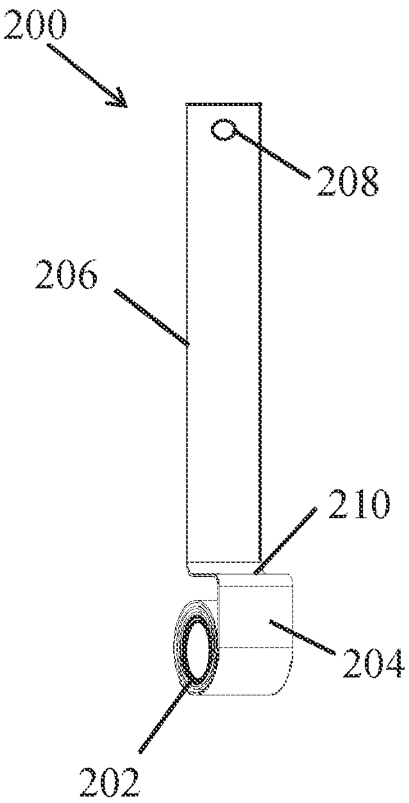
Figure 2C:
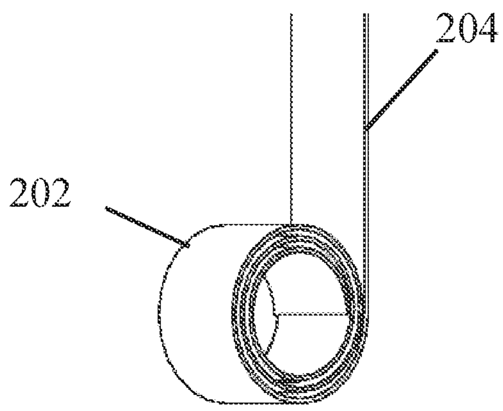

In some example embodiments, the coiled spring brackets 104, 106, as shown in FIGS. 1A and 1B, are each in a forcefully elongated position. To illustrate, FIGS. 2A-2C show a coiled spring bracket 200 for use in the trim attachment system of FIG. 1 according to an example embodiment. For example, the coiled spring bracket 200 may correspond to each one of the coiled spring brackets 104, 106 shown in FIGS. 1A and 1B. In some example embodiments, the coiled spring bracket 200 includes a coil section 202, an uncoiled section 204, an elongated section 206, and a transition section 210. The coil section 202 may be partially or fully uncoiled to elongate the uncoiled section 204 thereby elongating the coiled spring bracket 200. For example, a downward or an uncoiling force may be applied to the coil section 202 to uncoil the coil section 202 into the uncoiled section 204. To illustrate, the coil section 202 may be partially or fully uncoiled by inserting a finger or a tool through the coil section 202 and pulling downwardly on the coil section 202 while the coiled spring bracket 200 is held firmly in place.

Figure 3:
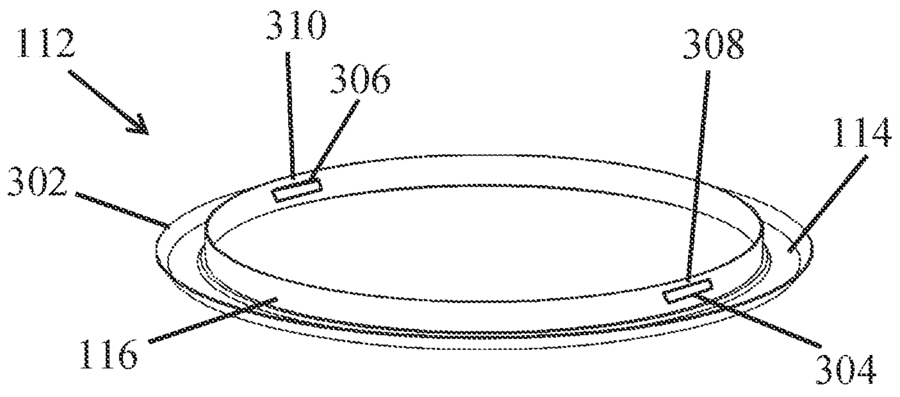
FIG. 3 illustrates the trim designed for attachment to the trim attachment system of FIG. 1A according to an example embodiment.

In some example embodiments, the coil section 202 may also be fully uncoiled to become the uncoiled section 204 such that an end portion of the uncoiled section 204 can be inserted into a slot of the trim 112 to attach the coiled spring bracket 200 to the trim 112. The uncoiled section 204 can then be recoiled into the coil section 202 such that the coil section 202 is positioned coiled through the slot. To illustrate, FIG. 3 shows the trim 112 designed for attachment to the trim attachment system 100 of FIG. 1A according to an example embodiment as shown in FIG. 1B. Referring to FIG. 3, the trim 112 may include the flange section 114 and the collar section 116 shown in FIG. 1B, and the collar section 116 may include slots 304, 306 that are formed therethrough. The flange section 114 may have an outer perimeter edge 302 that is entirely flat or that is relatively raised with respect to other section(s) of the flange section 114.

Referring to FIGS. 1A-3, in some example embodiments, considering the coiled spring bracket 200 as corresponding to the coiled spring bracket 104, after the coil section 202 is fully uncoiled to become the uncoiled section 204 and an end portion of the uncoiled section 204 is inserted into the slot 304 of the trim 112, the coil section 202 may be recoiled through the slot 304 and around a section 308 of the collar section 116. After the coil section 202 is recoiled through the slot 304, the coil section 202 of the coiled spring bracket 200 may be positioned coiled through the slot 304 and around the section 308 and thereby retaining the trim 112 attached to the coiled spring bracket 200. In some alternative embodiments, the collar section 116 of the trim 112 may include another slot above or below the slot 304 such that the coil section 202 is coiled through both the slot 304 and the other slot.

In some example embodiments, considering the coiled spring bracket 200 as corresponding to the coiled spring bracket 106, after the coil section 202 is fully uncoiled into the uncoiled section 204 and an end portion of the uncoiled section 204 is inserted into the slot 306 of the trim 112, the coil section 202 may be recoiled through the slot 306 and around a section 310 of the collar section 116. After the coil section 202 is recoiled through the slot 306, the coil section 202 of the coiled spring bracket 200 may be positioned coiled through the slot 306 and around the section 310 and thereby retaining the trim 112 attached to the coiled spring bracket 200. In some alternative embodiments, the collar section 116 of the trim 112 may include another slot above or below the slot 306, and the coil section 202 may be coiled through both the slot 306 and the other slot.

In some example embodiments, in the absence of an adequate downward force or uncoiling force that can uncoil the coil section 202, the coil section 202 may be fully coiled as shown in FIG. 2B. An adequate downward or uncoiling force may be applied to the coil section 202 to uncoil the coil section 202, for example, from the position shown in FIG. 2B to the position shown in FIG. 2A thereby elongating the uncoiled section 204. In general, the coil section 202 may be fully coiled or, by applying adequate force, partially or fully uncoiled. The coil section 202 is generally resilient and, when uncoiled by force, the coil section 202 may return to a fully coiled position in the absence of an adequate force to prevent recoiling.

Referring to FIGS. 2A-2C, the coiled spring bracket 200 may include an attachment feature 208 that may be used to attach the coiled spring bracket 200 to the light fixture housing 102 of FIG. 1A. For example, the attachment feature 208 may be hole in the elongated section 206 of the coiled spring bracket 200. Alternatively, the attachment feature 208 may be an integrally formed protrusion, a rivet, a screw, etc. that may be used to attach the coiled spring bracket 200 to the light fixture housing 102, for example, on the inside the light fixture housing 102.

Referring to FIGS. 1A-3, in some example embodiments, the transition section 210 provides a lateral/horizontal offset between the uncoiled section 204 and the elongated section 206. For example, when the elongated section 206 is attached to the light fixture housing 102 of FIG. 1A, the elongated section 206 may be in contact with or close to the wall of the light fixture housing 102. When the coil section 202 is fully or mostly coiled, such as to the position shown in FIG. 2B, the coil section 202 of the coiled spring bracket 200 and the collar section 116 of the trim 112 that is attached to the coil section 202 may fit through the opening 120 of the light fixture housing 102 because of the offset provided by the transition section 210.

In some alternative embodiments, the light fixture housing 102 may have a different shape than shown without departing from the scope of this disclosure. In some alternative embodiments, the trim 112 may have a different inner and/or outer perimeter shape (e.g., rectangular) than shown without departing from the scope of this disclosure. In some alternative embodiments, the collar section 116 of the trim 112 may be taller than shown without departing from the scope of this disclosure.

Figure 4A:
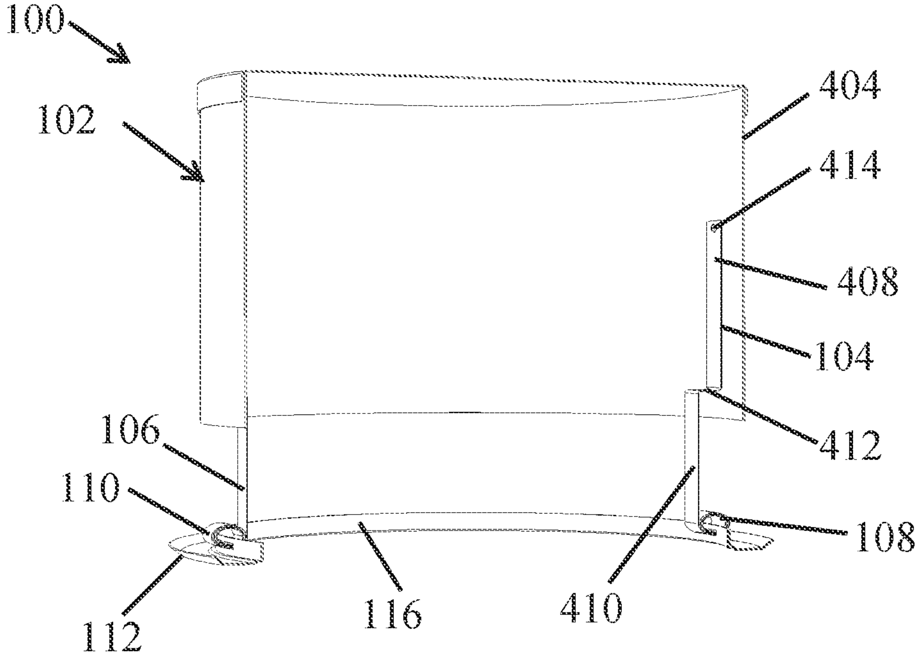
FIGS. 4A and 4B illustrate the trim attached to the trim attachment system of FIG. 1A shown with a portion of the light fixture housing removed for clarity of illustration according to example embodiment.
Figure 4B:
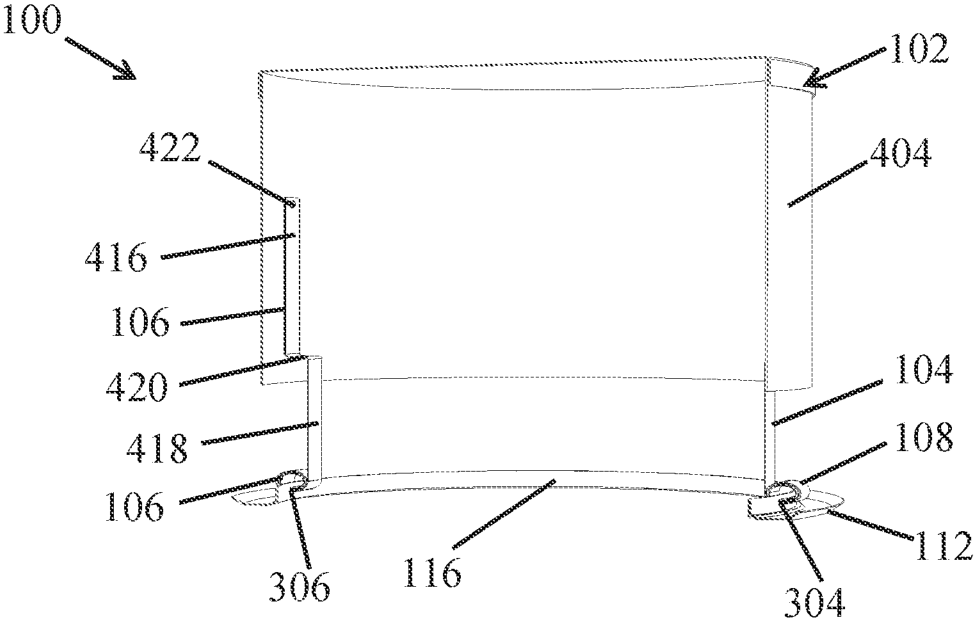

FIGS. 4A and 4B illustrate the trim 112 attached to the trim attachment system 100 of FIG. 1A shown with a portion of the light fixture housing 102 removed for clarity of illustration according to example embodiment. In some example embodiments, the coiled spring brackets 104, 106 may be attached to the wall 404 of the light fixture housing 102 on the inside of the light fixture housing 102. In FIGS. 4A and 4B, the trim 112 has already been attached to the coiled spring brackets 104, 106, for example, in the manner described with respect to the coiled spring bracket 200 of FIGS. 2A-2C.

To illustrate, the coiled spring bracket 104 may include the coil section 108, an elongated section 408, an uncoiled section 410, and a transition section 412. The coiled spring bracket 106 may include the coil section 110, an elongated section 416, an uncoiled section 418, and a transition section 420. The coil sections 108, 110 may each correspond to the coil section 202 of the coiled spring bracket 200 of FIGS. 2A-2C. The elongated sections 408, 416 may each correspond to the elongated section 206 of the coiled spring bracket 200 of FIGS. 2A-2C. The uncoiled sections 410, 418 may each correspond to the uncoiled section 204 of the coiled spring bracket 200 of FIGS. 2A-2C. The transition sections 412, 420 may each correspond to the transition section 210 of the coiled spring bracket 200 of FIGS. 2A-2C.

In some example embodiments, the coil sections 108, 110 may have been fully uncoiled to attach the trim 112 to the coiled spring brackets 104, 106 and recoiled through the respective one of the slots 304, 306 in the manner described with respect to the coiled spring bracket 200. For example, the trim 112 may be attached to the coiled spring brackets 104, 106 before or after the coiled spring brackets 104, 106 are attached to the light fixture housing 102. In some alternative embodiments, before the coiled spring brackets 104, 106 are attached to the light fixture housing 102, the elongated section 408 of the coiled spring bracket 104 and the elongated section 416 of the coiled spring bracket 106 may be inserted in the slot 304 and the slot 306 of the trim 112, respectively, and the remaining sections of the coiled spring brackets 104, 106 may be pulled through the respective one of the slots 304, 306 to attach the trim 112 to the coiled spring brackets 104, 106.

In some example embodiments, the coiled spring bracket 104 may each be attached to the wall 404 of the light fixture housing 102 by an attachment structure 414, and the coiled spring bracket 106 may each be attached to the wall 404 of the light fixture housing 102 by an attachment structure 422. For example, the attachment structures 414, 422 may be rivets, pins extending out from the housing, or another protruding structure. To illustrate, the attachment structure 414 may extend through the attachment feature in the elongated section 408 of the coiled spring bracket 104 to attach the coiled spring bracket 104 to the wall 404 of the light fixture housing 102. The attachment feature (e.g., a hole) in the elongated section 408 may correspond to the attachment feature 208 on the elongated section 206 of the coiled spring bracket 200 of FIGS. 2A-2C. The attachment structure 422 may extend through the attachment feature in the elongated section 416 of the coiled spring bracket 106 to attach the coiled spring bracket 106 to the wall 404 of the light fixture housing 102. The attachment feature (e.g., a hole) in the elongated section 416 may correspond to the attachment feature 208 on the elongated section 206 of the coiled spring bracket 200 of FIGS. 2A-2C. The coiled spring brackets 104, 106 may be attached to the light fixture housing 102 across from each other.

In some example embodiments, because of the resiliency of coil sections 108, 110 of the coiled spring brackets 104, 106, respectively, the coiled spring brackets 104, 106 are retained in the elongated positions in FIGS. 4A and 4B by applying a downward force on the trim 112 and/or on the coil sections 108, 110. For example, the trim 112 may be held in the position shown in FIGS. 4A and 4B by pulling down (e.g., by hand) on the trim 112, for example, until the trim 112 is desired to be pulled up, for example, to the ceiling shown in FIG. 1B. Upon the removal or reduction of a downward force on the trim 112, the uncoiled sections 410, 418 may be coiled more, thus pulling the trim 112 upward.

Figure 5A:
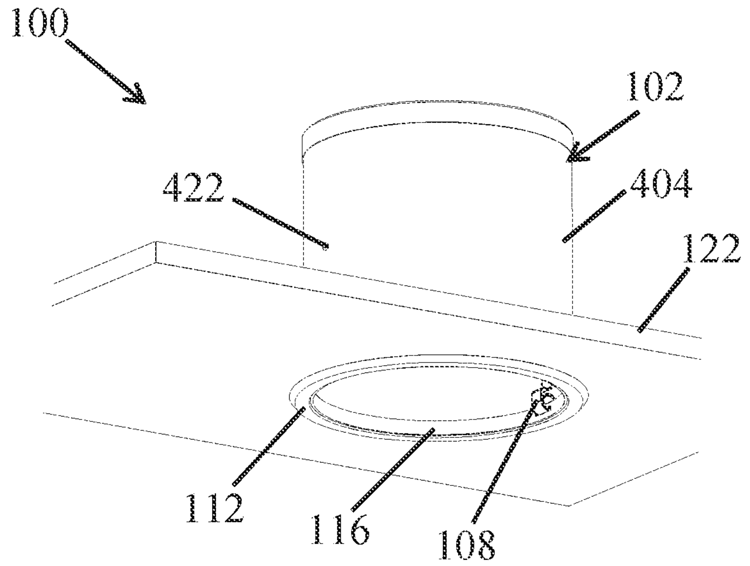
FIGS. 5A and 5B illustrate the trim pulled up to the ceiling by the trim attachment system of FIG. 1A according to an example embodiment.
Figure 5B:
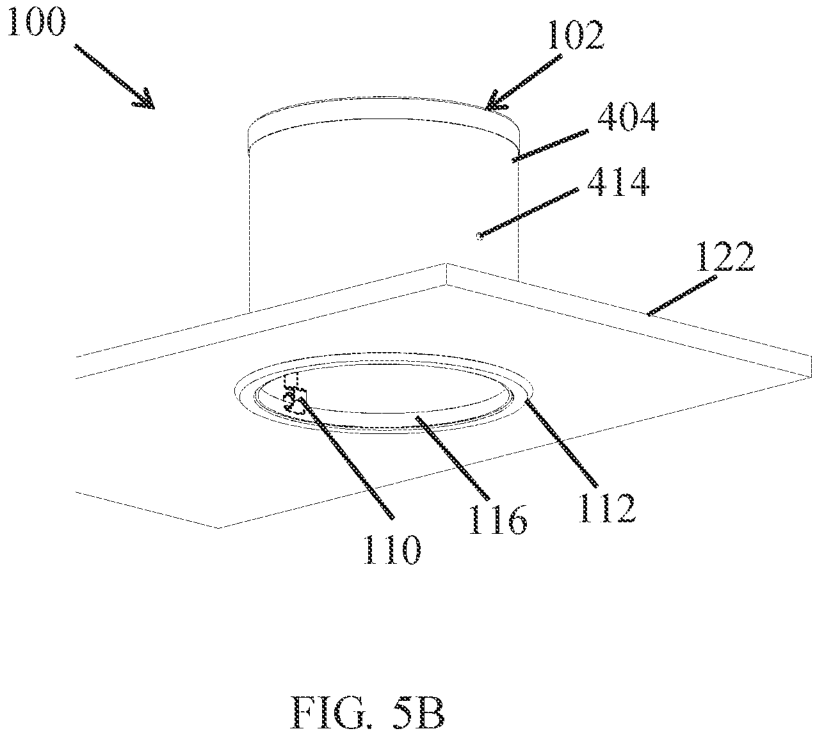

To illustrate, FIGS. 5A and 5B show the trim 112 pulled up to the ceiling 122 by the trim attachment system 100 of FIG. 1A according to an example embodiment. Referring to FIGS. 1A, 1B, 5A, 5B, in some example embodiments, before the trim 112 is attached to the coiled spring brackets 104, 106 of the trim attachment system 100, the light fixture housing 102 may be positioned at and/or through the opening 124 of the ceiling 122 such that the opening 120 of the light fixture housing 102 is aligned with the opening 124 of the ceiling 122. The coil sections 108, 110 may be uncoiled, for example, by pulling down on the coil sections 108, 110 to make the coil sections 108, 110 accessible from the below the light fixture housing 102. To illustrate, the coil sections 108, 110 may be uncoiled to elongate the coiled spring brackets 104, 106, which are attached to the wall 404 of the light fixture housing 102 by attachment structures 414, 422, such that the coil sections 108, 110 are accessible to attach to the trim 112. After the trim 112 is attached to the coil sections 108, 110, the coil sections 108, 110 may be recoiled when the downward force is removed or reduced such that the trim 112 is pulled up against the ceiling 122 from below ceiling 122. When the trim 112 is pulled up against the ceiling 122 by the coiled spring brackets 104, 106, a portion of the collar section 116 of the trim 112 may be positioned inside the light fixture housing 102 through the opening 120, and the flange section 114 of the trim 112 may be in contact with the ceiling 122 from below.

In some example embodiments, the trim 112 is attached to the coiled spring brackets 104, 106 of the trim attachment system 100 before the light fixture housing 102 is recessed in the ceiling 122. For example, after the coil sections 108, 110 are uncoiled, for example, by pulling on the coil sections 108, 110 and the trim 112 is attached to the coil sections 108, 110, the force may be removed such that the coil sections 108, 110 are reoiled thereby pulling the trim 112 to the opening 120 of the light fixture housing 102. The light fixture housing 102 may then be inserted upward through the opening 124 of the ceiling 122 such that flange section 114 of the trim 112 is positioned against the ceiling 122 from below. In general, the light fixture housing 102 may be retained recessed in the ceiling by various means, such as retention brackets, as can be readily understood by those of ordinary skill in the art with the benefit of this disclosure.

By enabling the attachment of the trim 112 without the need to remove the light fixture housing 102, the trim attachment system 100 can simplify the addition of a trim to a light fixture. By simplifying the detachment and attachment of a trim, such as the trim 112, from/to the trim attachment system 100, the trim attachment system 100 facilitates a quick removal of an existing trim from the trim attachment system 100 by pulling down on the existing trim from below and the attachment of a replacement trim.

In some alternative embodiments, the coiled spring brackets 104, 106 may be attached to the light fixture housing 102 by other means than described without departing from the scope of this disclosure. For example, the coiled spring brackets 104, 106 may be welded to the wall 404 of the light fixture housing 102. In some alternative embodiments, the coiled spring brackets 104, 106 may be attached to the light fixture housing 102 at a higher or lower location than shown without departing from the scope of this disclosure. In some alternative embodiments, the coiled spring brackets 104, 106 may be attached to a respective structure that extends out from the flange section 114 or from the collar section 116 of the trim 112 without departing from the scope of this disclosure. In some alternative embodiments, the coiled spring brackets 104, 106 may be attached to a different section of the trim 112 than shown without departing from the scope of this disclosure. In some alternative embodiments, the collar section 116 of the trim 112 may include vertical slots connected to the respective one of the slots 304, 306 for positioning the coil sections 108, 110 in the slots 304, 306 without fully uncoiling the coil sections 108, 110 without departing from the scope of this disclosure. In some alternative embodiments, the coiled spring brackets 104, 106 may have a different shape than shown without departing from the scope of this disclosure. In some alternative embodiments, the transition sections 412, 420 may be omitted or angled differently than shown without departing from the scope of this disclosure. In some alternative embodiments, the coil sections 108, 110 may be oriented in a different direction with respect to the respective one of the elongated sections 408, 410 of the coiled spring brackets 104, 106 without departing from the scope of this disclosure. In some alternative embodiments, the elongated sections 408, 416 of the respective one of the coiled spring brackets 104, 106 may be attached to a top cover of the light fixture housing 102 instead of or in addition to the wall 404 of the light fixture housing 102 without departing from the scope of this disclosure. In some alternative embodiments, the trim attachment system 100 may include more or fewer coiled spring brackets than shown without departing from the scope of this disclosure.

Figure 6:
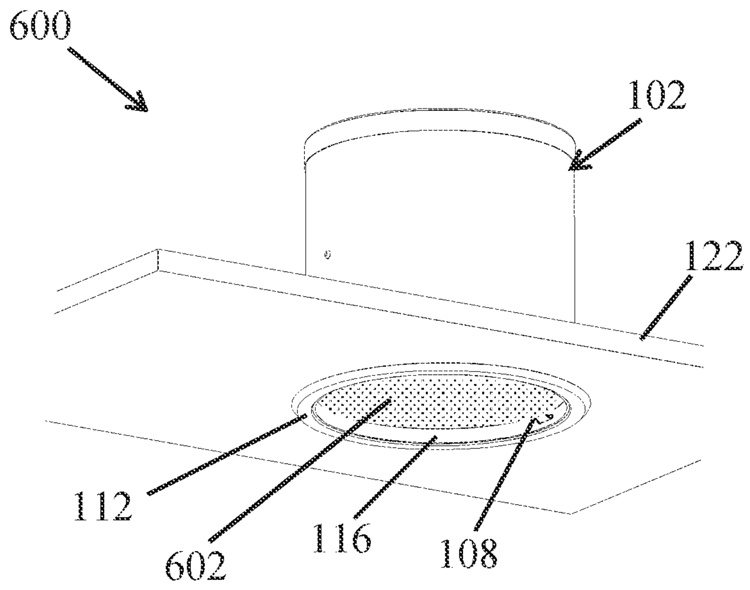
FIG. 6 illustrates a light fixture including the trim pulled up to the ceiling by the trim attachment system of FIG. 1A according to an example embodiment.

FIG. 6 illustrates a light fixture 600 including the trim 112 pulled up to the ceiling 122 by the trim attachment system 100 of FIG. 1A according to an example embodiment. Referring to FIGS. 1A-6, in some example embodiments, the light fixture 600 includes a light module 602 housed in the light fixture housing 102. For example, the light module 602 may be positioned in the cavity of the light fixture housing 102 after the trim 112 is attached to the coiled spring brackets 104, 106 and pulled up against the ceiling 122 by the coiled spring brackets 104, 106. In some alternative embodiments, the light module 602 may be placed in the cavity of the light fixture housing 102 before the trim 112 is attached to the coiled spring brackets 104, 106. For example, the coil sections 108, 110 may be pulled down to below the ceiling 122 and attached to the trim 112 and subsequently released to allow the coil sections 108, 110 to recoil thereby pulling up the trim 112 against the ceiling 122.

In some alternative embodiments, the light fixture 600 may include a different type of light module than the type of the light module 602 without departing from the scope of this disclosure. In some alternative embodiments, the light module 602 may be located higher or lower with respect to the light fixture housing 102 than shown without departing from the scope of this disclosure.

Figure 7:
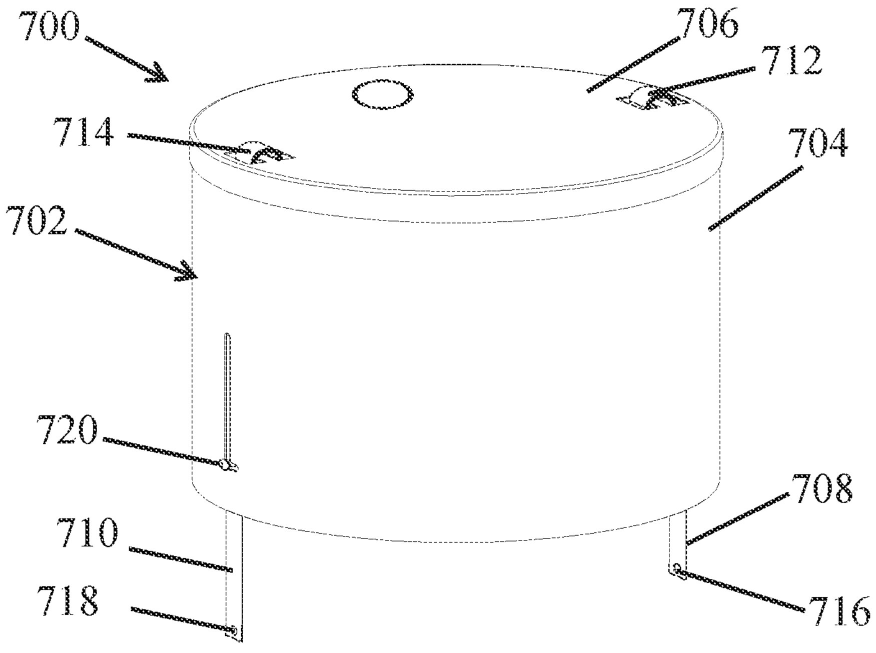
FIG. 7 illustrates a trim attachment system of a light fixture according to another example embodiment.
Figure 8:
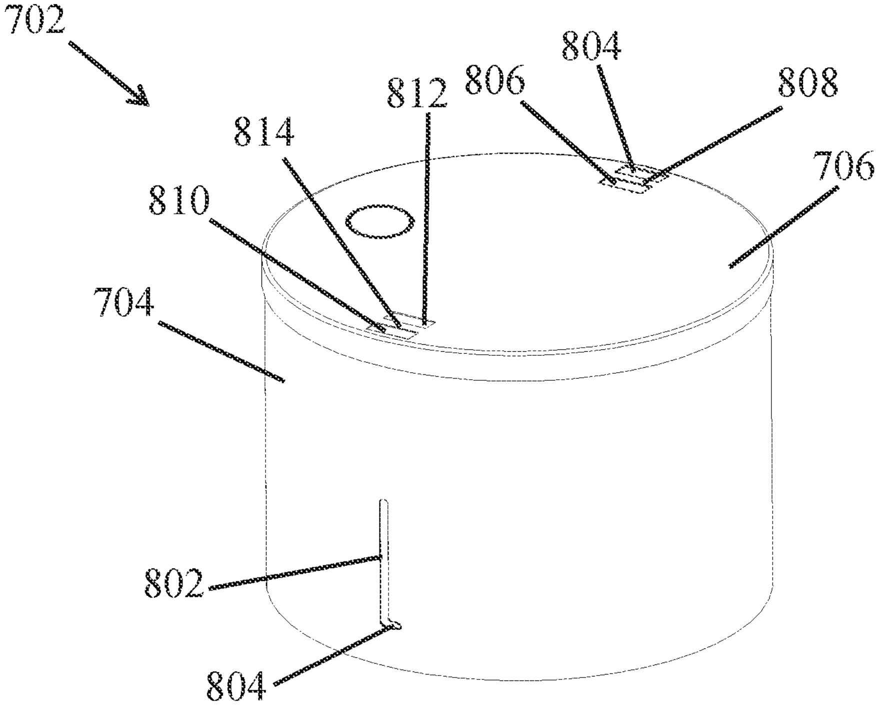
FIG. 8 illustrates a light fixture housing used in the trim attachment system of FIG. 7 according to an example embodiment.

FIG. 7 illustrates a trim attachment system 700 of a light fixture according to another example embodiment, and FIG. 8 illustrates a light fixture housing 702 used in the trim attachment system 100 of FIG. 7 according to an example embodiment. In some example embodiments, the trim attachment system 700 includes the light fixture housing 702 and coiled spring brackets 708, 710 that are attached to a top cover of the light fixture housing 702. The light fixture housing 702 may include a housing wall 704 and the top cover 706 attached to the housing wall 704 at a top end of the light fixture housing 702. The top cover 706 may have bracket attachment slots 804, 806, 810, 812 formed therethrough. The housing wall 704 may include a pair of elongated slots including the elongated slot 802, and a pair of retention slots including the retention slot 804. For example, the elongated slot 80 and the retention slot 804 may be connected to each other and may together form an L-shaped slot. The coiled spring brackets 708, 710 may be made from coil steel or another suitable material using methods such as rolling, bending, cutting, etc. as can be readily understood by those of ordinary skill in the art with the benefit of this disclosure. The light fixture housing 702 may be made from aluminum or another suitable material using methods such as cutting, bending, rolling, etc. as can be readily understood by those of ordinary skill in the art with the benefit of this disclosure.

In some example embodiments, the coiled spring bracket 708 may include a coil section 712 that is coiled through the bracket attachment slots 804, 806 and around a section 808 of the top cover 706 that is between the bracket attachment slots 804, 806. For example, the coil section 712, which is resilient, may first be fully uncoiled and then inserted and recoiled through the bracket attachment slots 804, 806. The coiled spring bracket 708 may also include an attachment feature 716 (e.g., a hole) that may be used to attach the coiled spring bracket 708 to a trim.

In some example embodiments, the coiled spring bracket 710 may include a coil section 714 that is coiled through the bracket attachment slots 810, 812 and around a section 814 of the top cover 706 that is between the bracket attachment slots 810, 812. The coil section 714, which is resilient, may first be fully uncoiled and then inserted and recoiled through the bracket attachment slots 810, 812. The coiled spring bracket 710 may also include an attachment feature 718 (e.g., a hole) that may be used to attach the coiled spring bracket 710 to a trim.

In some example embodiments, the coiled spring brackets 708, 710 may be pulled down, for example, to the positions shown in FIG. 7 such that the attachment features 716, 718 are accessible below the light fixture housing 702 to attach a trim to the coiled spring brackets 708, 710. That is, the coiled spring brackets 708, 710, as shown in FIG. 7, may each be in a forcefully elongated position. For example, when the coiled spring bracket 708 is pulled down, a retention pin 720 that extends from the coiled spring bracket 710 and positioned in the elongated slot 802 may move down through the elongated slot 802 until the bottom end of the elongated slot 802. The bottom end of the elongated slot 802 may limit further downward movement of the coiled spring bracket 710. From the bottom end of the elongated slot 802, the retention pin 720 may be moved over into the retention slot 804, which can retain the retention pin 720 and the coiled spring bracket 710 to which the pin 720 is attached in a fixed position without the need to pull down on the coiled spring bracket 710. When the coiled spring bracket 710 is pulled down, another retention pin extending out from the coiled spring bracket 710 may move down in another elongated slot of the light fixture housing 702, and the retention pin may then be moved into a connected retention slot to retain the coiled spring bracket 710 in a fixed position without the need to pull down on the coiled spring bracket 710.

In some alternative embodiments, the light fixture housing 702 may have a different shape than shown without departing from the scope of this disclosure. In some alternative embodiments, the slots 806, 806, 810, 812 may have a different shape or may be at different locations than shown without departing from the scope of this disclosure. In some alternative embodiments, the slots 802, 804 may have a different shape or may be at a different location than shown without departing from the scope of this disclosure.

Figure 9A:
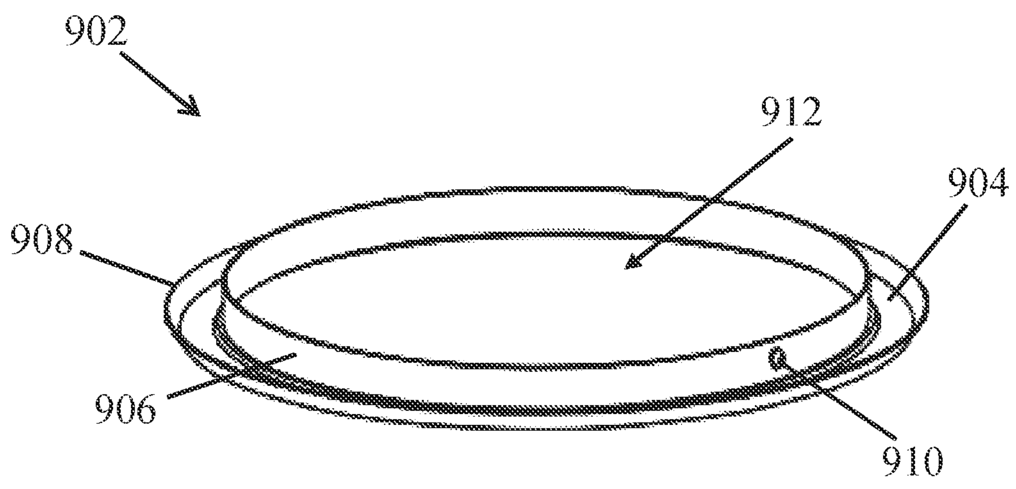
FIGS. 9A and 9B illustrate a trim designed for attachment to the trim attachment system of FIG. 7 according to an example embodiment.
Figure 9B:
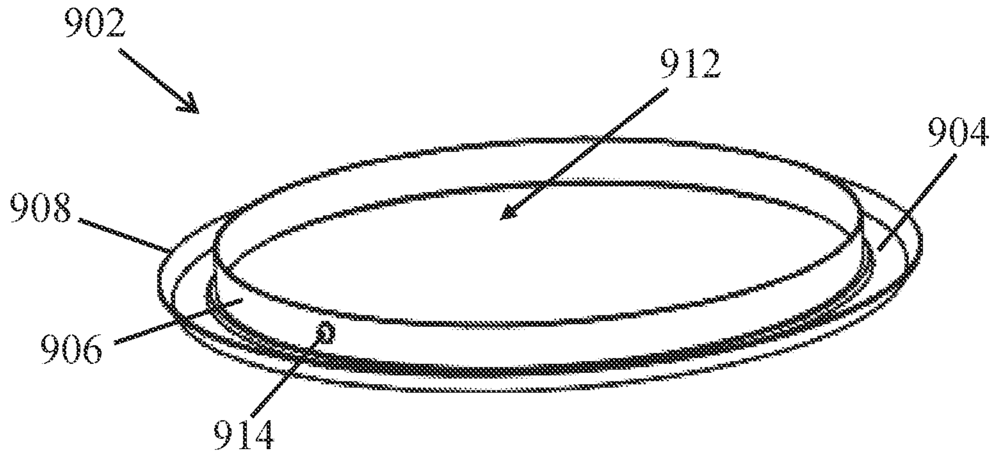

FIGS. 9A and 9B illustrate a trim 902 designed for attachment to the trim attachment system 700 of FIG. 7 according to an example embodiment. Referring to FIGS. 7-9B, in some example embodiments, the trim 902 may include a flange section 904 and a collar section 906 that, for example, extends up from the flange section 904. The flange section 904 and the collar section 906 are positioned around an opening 912 of the trim 902. The flange section 904 may have an outer perimeter edge 908 that is entirely flat or that is relatively raised with respect to other section(s) of the flange section 904.

In some example embodiments, the trim 902 may include attachment structures 910, 914 that extend outwardly from the collar section 906. For example, the attachment structures 910, 914 may be located across from each other. The attachment structures 910, 914 may be pins that protrude out from the collar section 906 and that are sized to fit in the respective one of the attachment features 716, 718. In some alternative embodiments, the attachment structures 910, 914 may be holes and may receive the respective one of the attachment features 716, 718, which may be, for example, protruding pins. In some alternative embodiments, the trim 902 may have an inner perimeter edge and/or an outer perimeter edge that have a different shape (e.g., rectangular) than shown in FIGS. 9A and 9B without departing from the scope of this disclosure. In some alternative embodiments, the collar section 906 of the trim 902 may be taller than shown without departing from the scope of this disclosure.

Figure 10:
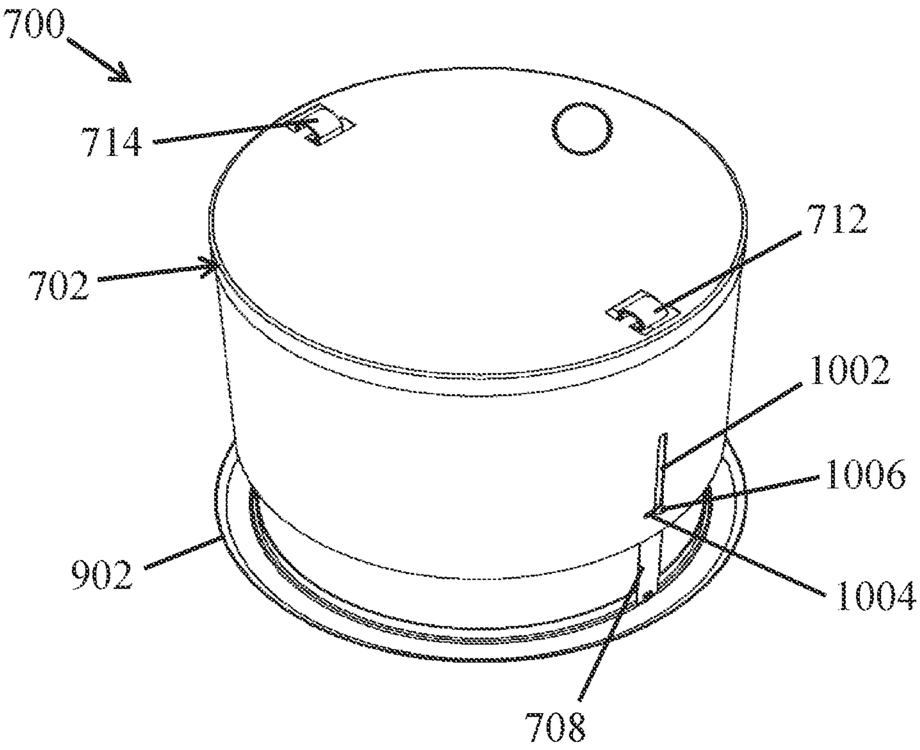
FIG. 10 illustrates the trim of FIGS. 9A and 9B attached to the trim attachment system of FIG. 7 according to another example embodiment.

FIG. 10 illustrates the trim 902 of FIGS. 9A and 9B attached to the trim attachment system 700 of FIG. 7 according to another example embodiment. Referring to FIGS. 7-10, in some example embodiments, the coil sections 712, 714 of the coiled spring brackets 708, 710 are positioned in the respective pair of slots 804, 806 or 810, 812. Before the trim 902 is attached to the coiled spring brackets 708, 710, the coiled spring brackets 708, 710 may be pulled down to make the attachment features 716, 718 of the coiled spring brackets 708, 710 accessible from below the light fixture housing 702. To illustrate, as the coiled spring bracket 710 is pulled down, the retention pin 720 moves down through the elongated slot 802, and the coiled spring bracket 710 is retained in a pulled-down position by moving the retention pin 720 into the retention slot 804. Because the coil section 714 of the coiled spring bracket 710 becomes partially uncoiled when the coiled spring bracket 710 is pulled down, placing the retention pin 720 in the retention slot 804 may prevent the coil section 714 from recoiling and pulling up the coiled spring bracket 710 when a pulldown force is no longer applied by a user on the coiled spring bracket 710.

In some example embodiments, the light fixture housing 702 may include an elongated slot 1002 and a retention slot 1004 that may together form an L-shaped slot. As the coiled spring bracket 708 is pulled down to make the attachment feature 716 accessible from below the light fixture housing 702, the coil section 712 of the coiled spring bracket 708 may become partially uncoiled and a retention pin 1006 extending from the coiled spring bracket 708 may slide down in the elongated slot 1002. At the bottom end of the elongated slot 1002, the retention pin 1006 may be moved sideways into the retention slot 1004. The retention slot 1004 may serve to prevent the coil section 712 from recoiling and pulling up the coiled spring bracket 708 when a downward force is no longer applied on the coiled spring bracket 708 by a user. In general, positioning the retention pin 1006 in the retention slot 1004 and the retention pin 720 in the retention slot 804 may retain the coiled spring brackets 708, 710 in a position that makes the attachment features 716, 718 of the coiled spring brackets 708, 710 convenient to attach the trim 902 thereto.

Figure 11:
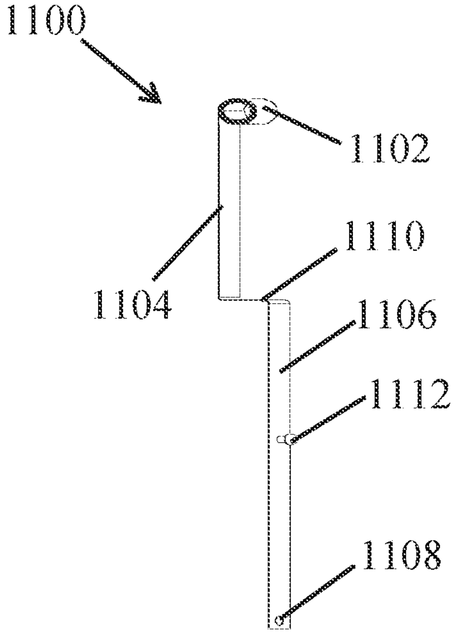
FIG. 11 illustrates a coiled spring bracket for use in the trim attachment system of FIG. 7 according to an example embodiment.

FIG. 11 illustrates a coiled spring bracket 1100 for use in the trim attachment system 700 of FIG. 7 according to an example embodiment. For example, the coiled spring bracket 1100 may correspond to each one of the coiled spring brackets 708, 710 shown in FIG. 7. In some example embodiments, the coiled spring bracket 1100 includes a coil section 1102, an uncoiled section 1104, an elongated section 1106, and a transition section 1110. The uncoiled section 1104 may be partially or fully coiled to become part of the coil section 1102, and the coil section 1102 may be partially or fully uncoiled to become part of the uncoiled section 1104.

In some example embodiments, the coil section 1102 may be partially uncoiled to elongate the uncoiled section 1104, thereby elongating the coiled spring bracket 1100. For example, the coil section 1102, as shown in FIG. 11, may be in a partially uncoiled position. To illustrate, the coiled section 1102 may be partially uncoiled by applying a downward force (e.g., pulling down) on the elongated section 1106 while the coil section 202 is held at a fixed position (e.g., attached to the top cover 706 of the light fixture housing 702 shown in FIG. 7). Elongating the coiled spring bracket 1100 can make an attachment feature 1108 (e.g., a hole) in the elongated section 1106 accessible for attachment to the trim 902 when the coiled spring bracket 1100 is attached, for example, to the top cover 706 of the light fixture housing 702 shown in FIG. 7. To illustrate, the attachment feature 1108 may correspond to each one of the attachment features 716, 718 of the coiled spring brackets 708, 710, respectively, shown in FIG. 7. For example, the attachment feature 1108 may be used to attach the coiled spring bracket 1100 to the trim 902 and may be a hole or alternatively a protruding structure such as a pin or a rivet.

Referring to FIGS. 7-11, in some example embodiments, the coil section 1102 may be positioned coiled through, for example, the bracket attachment slots 804, 806 in the top cover 706 of the light fixture housing 702 by first uncoiling the coil section 1102, inserting, and recoiling through the bracket attachment slots 804, 806. Because the coil section 1102 is resilient, the coil section 1102 may become recoiled upon the removal of the force applied for uncoiling. The coil section 1102 may also be positioned coiled through the bracket attachment slots 810, 812 in the top cover 706 of the light fixture housing 702 by first uncoiling the coil section 1102, inserting, and recoiling through the bracket attachment slots 810, 812. For example, the coil section 1102 may correspond to each one of the coil sections 712, 714.

In some example embodiments, the transition section 1110 provides a lateral/horizontal offset between the uncoiled section 1104 and the elongated section 1106. For example, when the coil section 1102 is attached to the top cover 706 of the light fixture housing 702, the elongated section 1106 may be attached to the wall 704 of light fixture housing 702, while the uncoiled section 1104 is spaced from the wall 704 of light fixture housing 702 by the offset provided by the transition section 1110. The offset provided by the transition section 1110 may position the elongated section 1106 at a convenient location to attach the trim 902.

In some example embodiments, the coiled spring bracket 1100 may include a retention pin 1112 extending out or otherwise attached to the elongated section 1106. For example, the retention pin 1112 may correspond to each one of the retention pins 720, 1006 shown in FIG. 7 and FIG. 10, respectively. The retention pin 112 may be used in limiting and guiding the movement of the coiled spring bracket 1100, for example, through the elongated slot 1002. The retention pin 112 may also help retain the coiled spring bracket 1100 in an elongated position when the retention pin 1112 is positioned, for example, in the retention slot 1004 of the light fixture housing 702. When the retention pin 1112 includes a head, such as when the retention pin 1112 is a rivet, the retention pin 1112 may help retain the elongated section 1106 in relative proximity to the wall 704 of the light fixture housing 702.

In some example embodiments, in the absence of an adequate force to uncoil the coil section 1102 or to prevent recoiling of the uncoiled section 1104 into the coil section 1102, the uncoiled section 1104 may be relatively shorter than shown in FIG. 11. For example, when the coiled spring bracket 1100 is attached to the light fixture housing 702, the attachment feature 1108 may be inside the cavity of the light fixture housing 702 of the coiled spring brackets 708, 710 in the absence of an adequate force to uncoil the coil section 1102 or to prevent recoiling.

In some alternative embodiments, the coiled spring bracket 1100 may have a different shape than shown in FIG. 11 without departing from the scope of this disclosure. In some alternative embodiments, the coiled spring bracket 1100 may have more sections than shown in FIG. 11 without departing from the scope of this disclosure. In some alternative embodiments, the transition section 1110 may be omitted or angled differently than shown in FIG. 11 without departing from the scope of this disclosure.

Figure 12A:
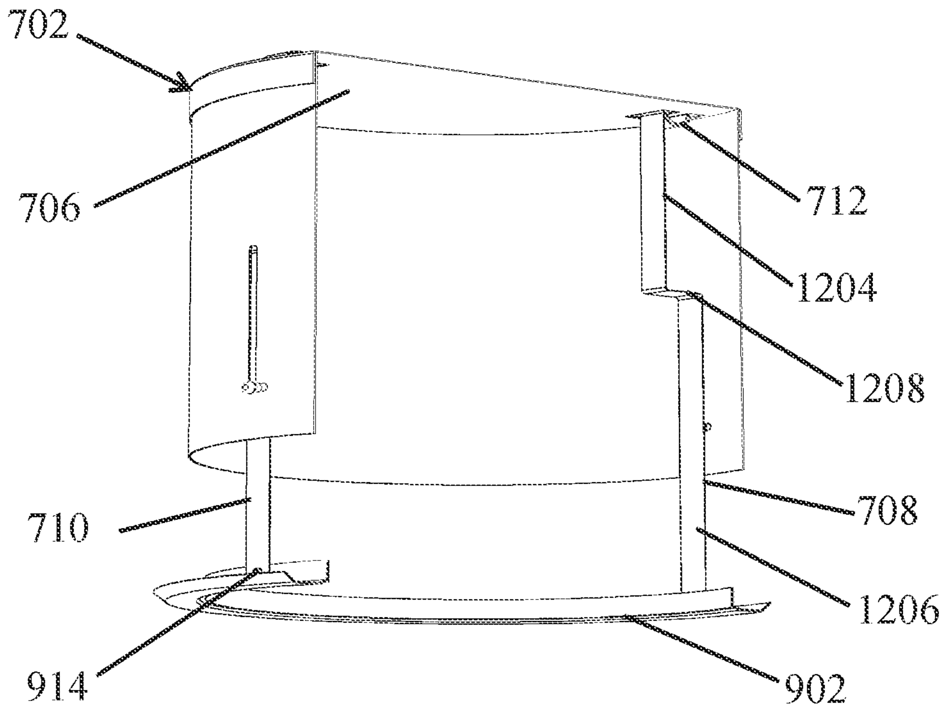
FIGS. 12A and 12B illustrate the trim attachment system attached to the trim shown with a portion of the light fixture housing removed for clarity of illustration according to example embodiment.
Figure 12B:
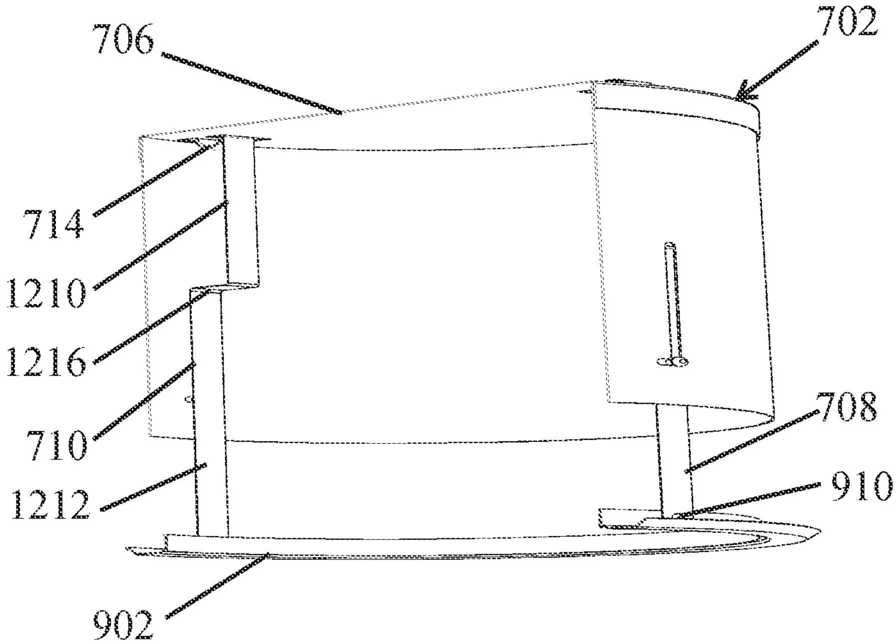

FIGS. 12A and 12B illustrate the trim attachment system 700 attached to the trim 902 shown with a portion of the light fixture housing 702 removed for clarity of illustration according to example embodiment. In some example embodiments, the coiled spring bracket 708 may include the coil section 712, an elongated section 1206, an uncoiled section 1204, and a transition section 1208. The coiled spring bracket 710 may include the coil section 714, an elongated section 1212, an uncoiled section 1210, and a transition section 1216. The coil sections 712, 714 may each correspond to the coil section 1102 of the coiled spring bracket 1100 of FIG. 11. The elongated sections 1206, 1212 may each correspond to the elongated section 1106 of the coiled spring bracket 1100 of FIG. 11. The uncoiled sections 1204, 1210 may each correspond to the uncoiled section 1104 of the coiled spring bracket 1100 of FIG. 11. The transition sections 1208, 1216 may each correspond to the transition section 1110 of the coiled spring bracket 1100 of FIG. 11. The retention pins 720, 1006 may each correspond to the retention pin 1112 of the coiled spring bracket 1100 of FIG. 11.

In FIGS. 12A and 12B, the coil sections 712, 714 are attached to the top cover 706 of the light fixture housing 702. After the coiled spring brackets 708, 710 are elongated to the elongated position shown in FIGS. 12A and 12B, the trim 902 is attached to the coiled spring brackets 708, 710. For example, the attachment structure 914 of the trim 902 may be inserted into the attachment feature 718 of the coiled spring bracket 710, and the attachment structure 910 of the trim 902 may be inserted into the attachment feature 716 of the coiled spring bracket 708. In some alternative embodiments, the coiled spring brackets 708, 710 may include structures that are inserted into respective holes in the trim 902.

Because the coiled spring brackets 708, 710 are in the elongated position as shown in FIGS. 12A and 12B, the uncoiled sections 1204, 1210 may be recoiled pulling the trim 902 up toward the light fixture housing 702 when the coiled spring brackets 708, 710 are no longer forced to be in the elongated position.

Figure 13:
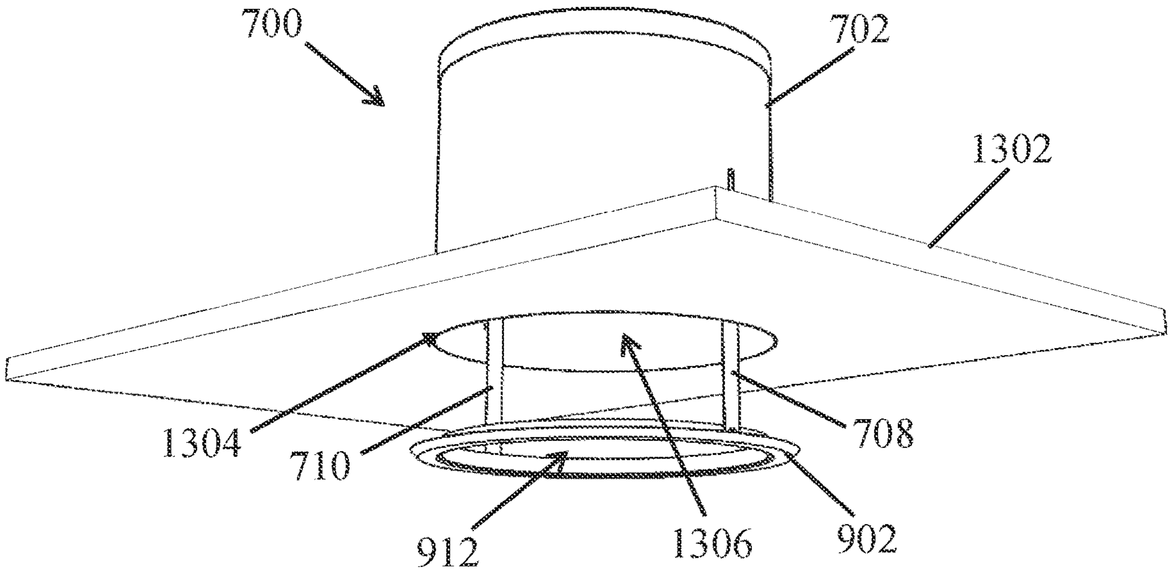
FIG. 13 illustrates the trim of FIGS. 9A and 9B attached to the trim attachment system of FIG. 7 and in a pulled down position according to an example embodiment.

FIG. 13 illustrates the trim 902 of FIGS. 9A and 9B attached to the trim attachment system 700 of FIG. 7 and in a down position according to an example embodiment. Referring to FIGS. 7 and 12A-13, in some example embodiments, after the trim 902 is attached to the trim attachment system 700, the light fixture housing 702 may be pushed up into a ceiling 1302 through an opening 1304 in the ceiling 1302. For example, the opening 912 of the trim 902 may be aligned with the opening 1304 of the ceiling 1302 and an opening 1306 of the light fixture housing 702. After the light fixture housing 702 is recessed in the ceiling 1302, the coiled spring brackets 708, 710 along with the trim 902 may be pulled up when the uncoiled sections 1204, 1210 of the coiled spring brackets 708, 710, respectively, are recoiled, for example, when the retention pins 720, 1006 are moved out of the respective one of the retention slots 804, 1004.

Figure 14:
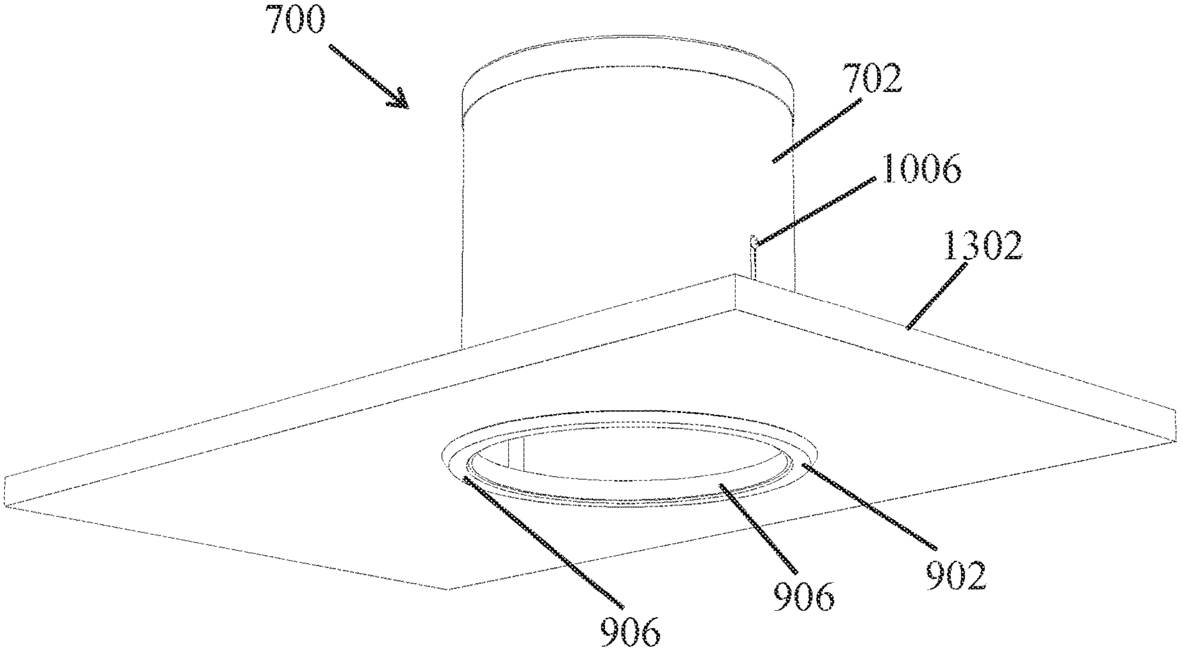
FIG. 14 illustrates the trim of FIGS. 9A and 9B attached to the trim attachment system of FIG. 7 and in a pulled up position according to an example embodiment.
Figure 15:
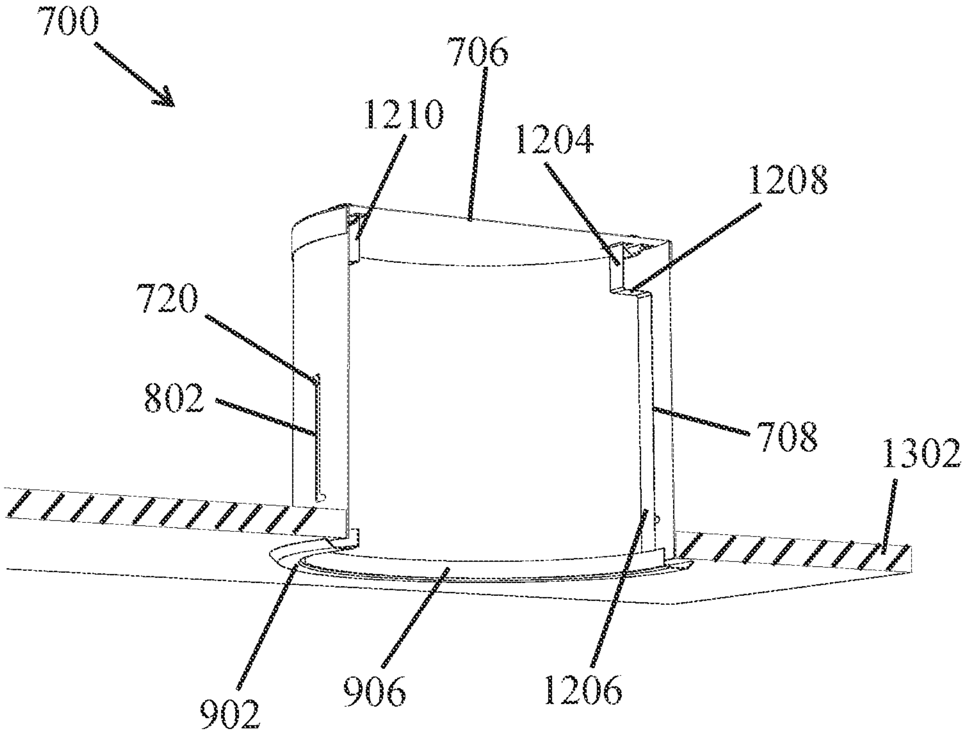
FIG. 15 illustrates the trim of FIGS. 9A and 9B attached to the trim attachment system of FIG. 7 and in a pulled up position with a portion of the light fixture housing removed for clarity of illustration according to an example embodiment.

To illustrate, FIG. 14 shows the trim 902 of FIGS. 9A and 9B attached to the trim attachment system 700 of FIG. 7 and in a pulled up position according to an example embodiment, and FIG. 15 shows the trim 902 of FIGS. 9A and 9B attached to the trim attachment system 100 of FIG. 7 and in the pulled up position with a portion of the light fixture housing 702 removed for clarity of illustration according to an example embodiment. In FIGS. 14 and 15, the coiled spring brackets 708, 710 are in a shortened position, where the uncoiled sections 1204, 1210 are shorter than in FIGS. 12A and 12B that show the coiled spring brackets 708, 710 in the elongated position and the trim 902 spaced farther from the light fixture housing 702. In contrast to FIG. 12A, FIG. 15 also shows the transition section 1208 of the coiled spring bracket 708 is closer to the top cover 706 of the light fixture housing 702 and the elongated section 1206 of the coiled spring bracket 708 entirely or almost entirely pulled up the inside of the light fixture housing 702.

In some example embodiments, the retention pin 720 is pulled up to the top end portion of the elongated slot 802, and the retention pin 1006 is pulled up to the top end portion of the elongated slot 1002. For example, the top end portions of the elongated slots 802, 1002 can limit the upward movement of the coiled spring brackets 708, 710 such that the trim 902 does not come in contact with the ceiling 1302. Alternatively, the trim 902 may come in contact with the ceiling 1302 before the retention pin 720 reaches the top end of the elongated slot 802 and before the retention pin 1006 reaches the top end of the elongated slot 1002.

In general, the light fixture housing 702 may be retained recessed in the ceiling by one or more structures (not shown), such as brackets, as can be readily understood by those of ordinary skill in the art with the benefit of this disclosure.

Figure 16:
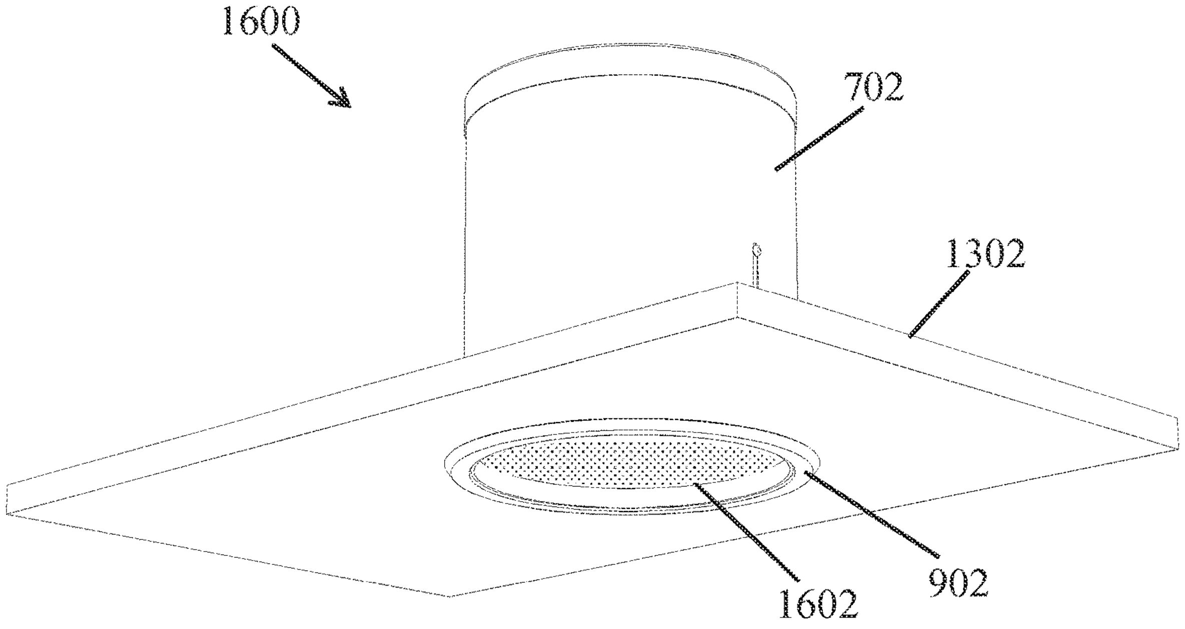
FIG. 16 illustrates a light fixture including the trim of FIGS. 9A and 9B pulled up to the ceiling by the trim attachment system of FIG. 7 according to an example embodiment.

FIG. 16 illustrates a light fixture 1600 including the trim 902 of FIGS. 9A and 9B pulled up to the ceiling 1302 by the trim attachment system 700 of FIG. 7 according to an example embodiment. Referring to FIGS. 7-16, in some example embodiments, the light fixture 1600 includes a light module 1602 housed in the light fixture housing 702. The light module 1602 may be positioned in the cavity of the light fixture housing 702 after the trim 902 is attached to the coiled spring brackets 708, 710 and pulled up against the ceiling 1302 by the coiled spring brackets 708, 710. In some alternative embodiments, the light module 1602 may be placed in the cavity of the light fixture housing 702 before the trim 902 is attached to the coiled spring brackets 708, 710.

By enabling the attachment of the trim 902 without the need to remove the light fixture housing 702, the trim attachment system 700 can simplify the addition of a trim to a light fixture. By simplifying the detachment and attachment of a trim, such as the trim 902, from/to the trim attachment system 700, the trim attachment system 700 facilitates a quick removal of an existing trim from the trim attachment system 700 by pulling down on the existing trim from below and the attachment of a replacement trim.

In some alternative embodiments, the light fixture 1600 may include a different type of light module than the type of the light module 1602 without departing from the scope of this disclosure. In some alternative embodiments, the light module 1602 may be located higher or lower with respect to the light fixture housing 102 than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A trim attachment system, comprising:

a light fixture housing;

a first coiled spring bracket having a first coil section and a first elongated section, wherein the first elongated section is positioned in the light fixture housing and attached to the light fixture housing and wherein the first coil section is attachable to a trim to pull up the trim toward an opening of the housing, wherein the first coil section is a rolled resilient material; and a second coiled spring bracket having a second coil section and a second elongated section, wherein the second elongated section is positioned in the light fixture housing and attached to the light fixture housing and wherein the second coil section is attachable to the trim to pull up the trim toward the opening of the housing, wherein the second coil section is a rolled resilient material;

wherein the first coil section is configured to unroll at least a portion of the first coil section to elongate an uncoiled portion of the first coil section such that the elongated uncoiled portion of the first coil section is extendable below the light fixture housing, and wherein the second coiled section is configured to unroll at least a portion of the second coil section to elongate an uncoiled portion of the second coil section such that the elongated uncoiled portion of the second coil section is extendable below the light fixture housing.

2. The trim attachment system of claim 1, wherein the first coil section is coiled around a first section of the trim when the first coil section is coiled through a first coil slot of the trim and wherein the second coil section is coiled around a second section of the trim when the second coil section is coiled through a second coil slot of the trim.

3. The trim attachment system of claim 1, wherein the first coiled spring bracket comprises a first attachment feature, wherein the second coiled spring bracket comprises a second attachment feature, wherein the first elongated section is attached to the light fixture housing by the first attachment feature and a first bracket attachment feature of the light fixture housing, and wherein the second elongated section is attached to the light fixture housing by the second attachment feature and a second bracket attachment feature of the light fixture housing.

4. The trim attachment system of claim 3, wherein the first attachment feature is a first hole formed through the first elongated section and designed to receive the first bracket attachment feature therethrough and wherein the second attachment feature is a second hole formed through the second elongated section and designed to receive the second bracket attachment feature therethrough.

5. The trim attachment system of claim 1, wherein the first coiled spring bracket comprises a first transition section, wherein the first transition section horizontally offsets the elongated uncoiled portion of the first coil section.

* * * * *